(No Model.) 2 Sheets—Sheet 2.
W. C. BAIRD.
RAILWAY GATE.
No. 326,828. Patented Sept. 22, 1885.
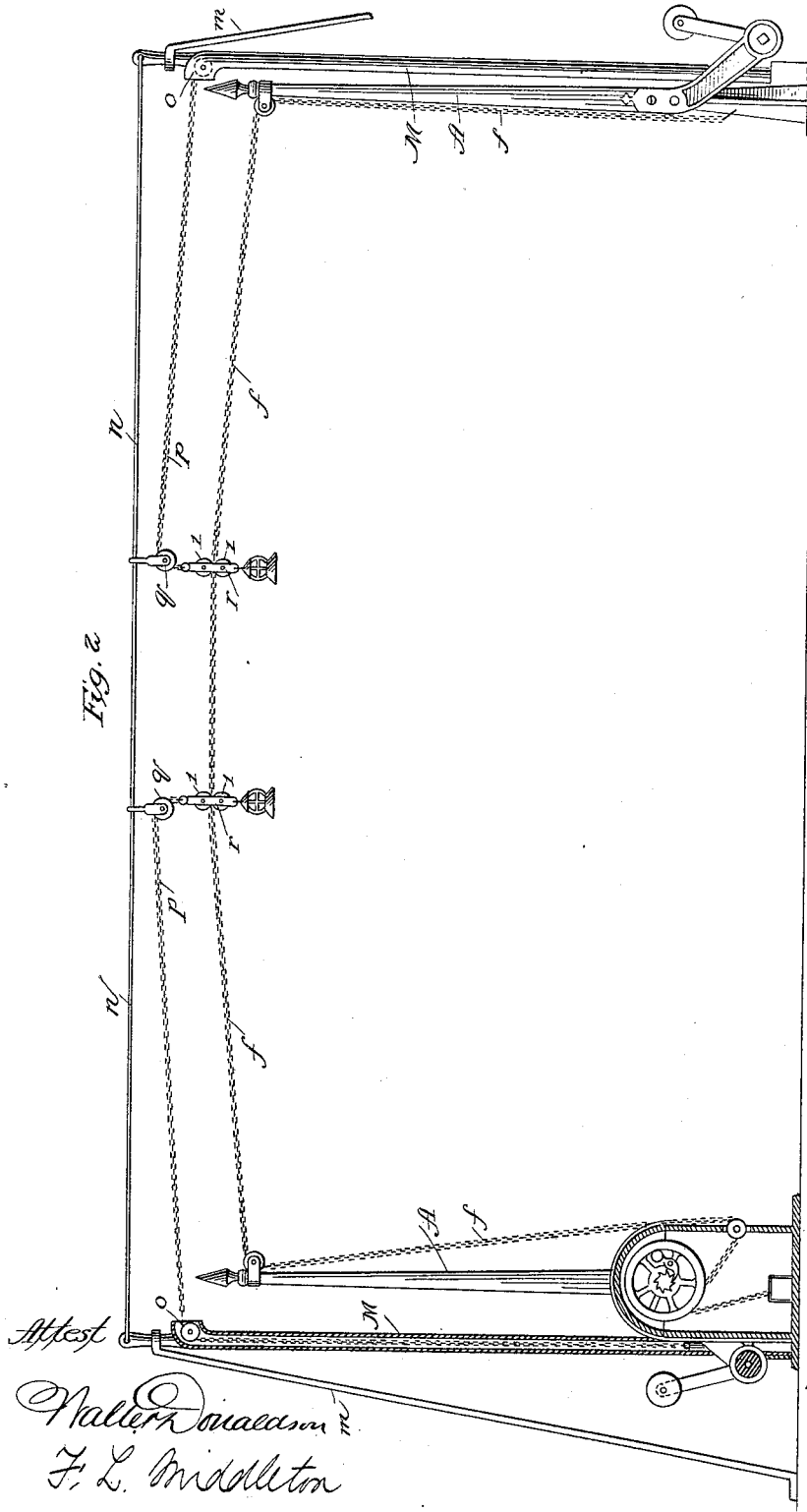

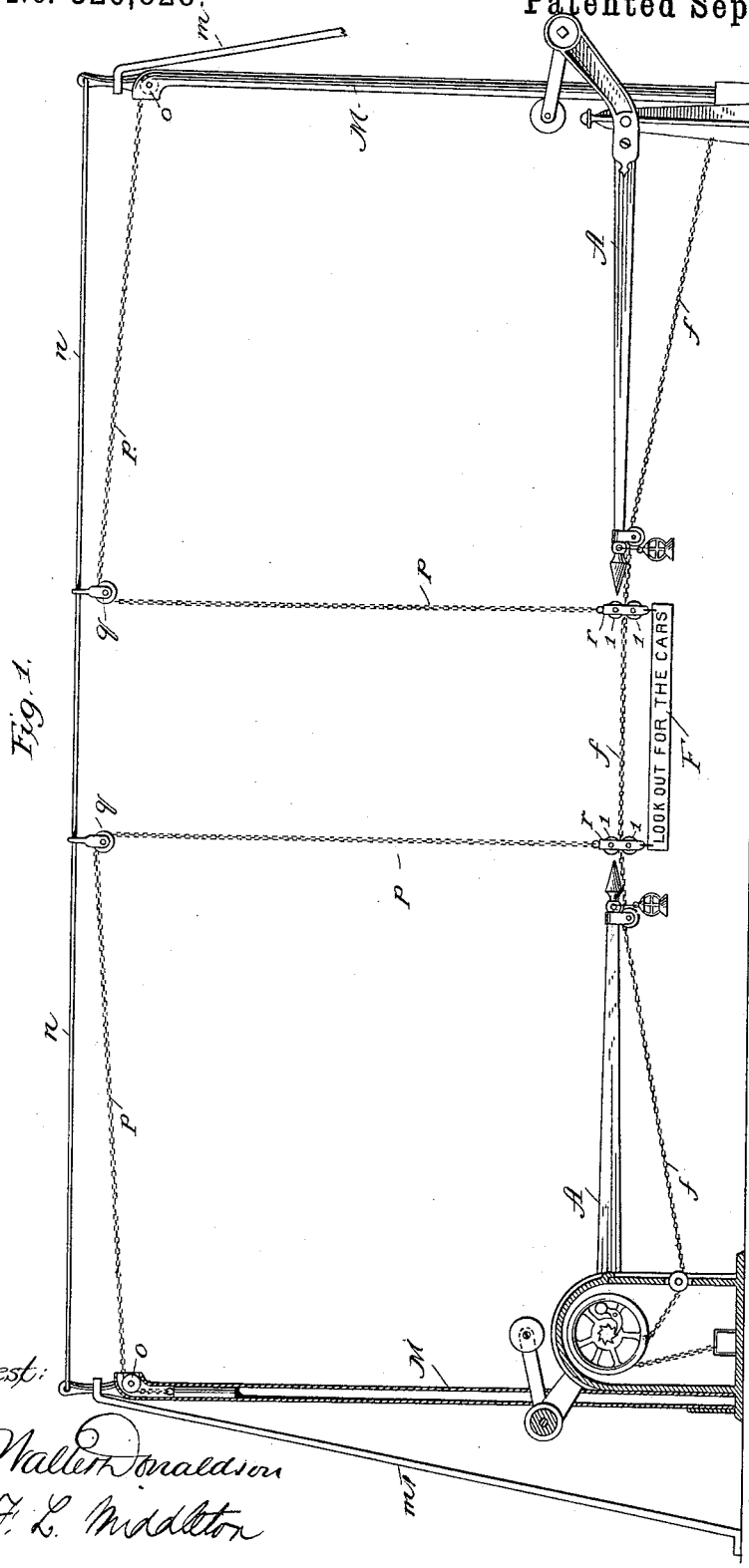

United States Patent Office.

WILLIAM C. BAIRD, OF NEW YORK, N. Y., ASSIGNOR TO THE COPELAND MANUFACTURING COMPANY, OF SAME PLACE, AND SYRACUSE, N. Y.

RAILWAY-GATE.

SPECIFICATION forming part of Letters Patent No. 326,828, dated September 22, 1885.

Application filed May 16, 1885. (No model.)

*To all whom it may concern:*

Be it known that I, WILLIAM C. BAIRD, of New York, in the county of New York and State of New York, have invented a new and useful Improvement in Railway-Gates; and I do hereby declare that the following is a full, clear, and exact description of the same.

My invention relates to the railway-gate shown in Letters Patent granted to the Copeland Manufacturing Company on the 28th of April, 1885, No. 316,747.

The object of the invention is to afford a support for the chains which connect the free ends of the bars which form the gate, whereby the central part of the chains is raised when the gate is open to a higher point above the roadway, the necessary length of the bars is diminished, the movement of the bars is steadied, and whereby, also, a suitable signal is supported upon that part of the chain which is between the ends of the bars when they are lowered.

The improvement consists, essentially, of a supporting chain or rope or chains or ropes connected with the chain which operates the bars, the supporting-chains being provided with suitable counter-weights.

It consists, further, of details of construction hereinafter explained.

In the the accompanying drawings, Figure 1 shows a side elevation of a single pair of bars in a lowered or closed position. Fig. 2 is a side elevation of a single pair of bars in a raised position.

In carrying out my invention I fix a supporting-post, M, upon or near the base of each pivoted bar. I preferably make these posts of large gas-pipe and attach them to the rear of the base in line with the bars when said bars are in a raised position. These posts I may firmly brace by suitable stays, *m*. The tops of the posts on each side of the roadway are connected by a wire, *n*, stretched taut. This wire is preferably No. 12 steel wire. The posts are also provided near their tops with sheaves *o*. When the posts are made hollow, holes are made in the pipe a little above the sheaves and in line with the grooves therein, so that the chains *p* may be run into the pipes and connected to counter-weights, which slide freely up and down within the said pipes. If desired, a coupling may be put in the pipes M, with a curved opening to contain and protect the sheave, and the post run up vertically above this coupling, similar to the construction shown in the figures. The inner ends of the chains or ropes *p* run over the sheaves or pulleys *q*, which are fixed to the supporting-wire *n*, extend downwardly, and are connected with the chain *f*, which operates the gate-bars. I preferably form the connection of the chains *p* with the chain *f* by means of a pulley-block, *r*, having a pair of sheaves, 1, the chain *p* running between the sheaves freely, while the block affords a hold upon the chain, so that it may be raised or drawn upward by the counter-weight on the chain *p*.

I have shown in connection with one pair of bars A, on one side of the railway, two chains, *p p*, with their pulleys on the supporting-wire *n*, and the pulleys which connect them with the chain *p;* but I do not limit myself to the use of two, as I may prefer to make one chain serve the purpose of both. The action of two, however, is steadier. In the use of the gate shown in the aforesaid patent, when the bars A are raised to open the gate, the distance between their ends is at the maximum, and the chains connecting the ends then sag in the center, there being unavoidably some slack. The effect of the chain *p* with its counterbalancing-weight is to take up this slack of the chain *p*, and to raise it higher than the ends of the bars A when they are in the position shown in Fig. 2. The weight of the counterbalance is made sufficient for this purpose. The effect of the counterbalance applied in the manner described being to raise the middle part of the chains when the gates are open, the bars A may be made shorter than they otherwise would be made; and, further, the support at the central part of the chain is communicated to the tops of the bars, and their movement up and down is thereby steadied, the counter-weights serving to assist in their movement.

As the chain in the gate shown in the aforesaid patent forms the middle part of the gate when the bars are down, it is desirable to have attached thereto a plainly-visible sign, which is also useful when the gates are raised. The chain having the support above described intermediate of the ends of the bars, a sign may be added without injurious effect arising from its weight, or consequent sagging of the chain, the counter weight or weights serving to counterbalance the weight of the sign also. I have therefore combined with the blocks of the pulleys $r$ a sign, F, which I prefer to make of thin sheet metal, or any other material not affected by exposure to the atmosphere. When two chains $p$ are used, this sign is located preferably upon the chain $p$ between the pulleys $r$; but I do not limit myself in respect to its position, provided it is located between the ends of the bars.

The sign may have upon it any suitable inscription. In its place, or in addition to it, a lantern or lanterns may be suspended from the blocks in the night-time.

It will be readily understood that instead of the posts M any other suitable supports may be used for the wire $n$, or that the chains $p$ may be carried on pulleys to any convenient support.

I claim as my invention—

1. In combination with the bars pivoted to move in vertical plane, and the rope or chain connecting the free ends of the bars and adapted to draw said bars down and to form a part of the gate when the bars are down, the chain or rope $p$, having suitable supporting-pulley and counter-weight and connected with the rope or chain first specified at a point between the free ends of the bars, whereby the rope or chain first specified is supported, substantially as described.

2. In combination with the bars pivoted to move in vertical plane, and the rope or chain connecting the free ends of the bars and adapted to draw said bars down and to form a part of the gate when the bars are down, a pair of chains or ropes, $p$, connected with the rope or chain first specified at a point between the free ends of the bars, and a counter-weight on the chain $p$, substantially as described.

3. In combination with the bars pivoted to move in vertical plane, and the rope or chain connecting the free ends of the bars and adapted to draw said bars down and to form part of the gate when the bars are down, the chain or rope $p$, having suitable supporting-pulley and counter-weight, and connected with the rope or chain first specified at a point between the free ends of the bars, and the sign attached to the chain or rope between the free ends of the bars, substantially as described.

4. In combination with the pivoted bars A and connecting-chain $f$, a pair of posts, M, and connecting-wire $n$, and a chain, $p$, with its counter-weight, the supporting-pulleys, and connections with the chain $f$, substantially as described.

5. A pair of hollow posts, M, the connecting-wire $n$, and the chains $p$ $p$, connected to the wire $f$, and counter-weights within the posts, all combined with the pivoted bars substantially as described.

In testimony whereof I have signed my name to this specification in the presence of two subscribing witnesses.

WILLIAM C. BAIRD.

Witnesses:
 F. L. MIDDLETON,
 WALTER DONALDSON.